· US008972163B2

United States Patent
Green et al.

(10) Patent No.: US 8,972,163 B2
(45) Date of Patent: *Mar. 3, 2015

(54) VEHICLE FUEL EFFICIENCY OPTIMIZATION BASED ON VEHICLE USAGE PATTERNS

(71) Applicant: International Business Machines Corporation, Armonk, NY (US)

(72) Inventors: Rendell L. Green, Mansfield, TX (US); Rick A. Hamilton, II, Charlottesville, VA (US); Brian M. O'Connell, Research Triangle Park, NC (US); James W. Seaman, Falls Church, VA (US); Richard H. Stephen, Clifton Park, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/296,645

(22) Filed: Jun. 5, 2014

(65) Prior Publication Data

US 2014/0288812 A1 Sep. 25, 2014

Related U.S. Application Data

(63) Continuation of application No. 12/634,712, filed on Dec. 10, 2009, now Pat. No. 8,793,064.

(51) Int. Cl.
*G06F 19/00* (2011.01)
*G06G 7/70* (2006.01)
(Continued)

(52) U.S. Cl.
CPC ............ *G07C 5/0816* (2013.01); *B60W 40/09* (2013.01); *B60W 50/14* (2013.01); *G06Q 30/02* (2013.01); *G06Q 30/0207* (2013.01); *B60K 2350/1092* (2013.01)

USPC .......... 701/123; 701/99; 701/110; 73/114.52; 73/114.53; 73/114.54; 340/438; 340/439

(58) Field of Classification Search
USPC ...................... 701/1, 34.4, 99, 101–115, 123; 73/114.52, 114.53, 114.54; 340/438, 340/439

See application file for complete search history.

(56) References Cited

U.S. PATENT DOCUMENTS 6,092,021 A * 7/2000 Ehlbeck et al. ............... 701/123
2004/0068433 A1 * 4/2004 Chatterjee et al. ............. 705/13

(Continued)

OTHER PUBLICATIONS

Rami Khatib, USPTO Office Action, U.S. Appl. No. 12/634,712, Mail Date Jul. 5, 2012, 23 pages.

(Continued)

*Primary Examiner* — Rami Khatib
(74) *Attorney, Agent, or Firm* — William E. Schiesser; Darrell L. Pogue; Keohane & D'Alessandro PLLC

(57) ABSTRACT

Approaches for indicating vehicle fuel efficiency for vehicle usage patterns are provided. Patterns of inefficient operation are detected and conveyed to a user to inform the user of the impact of his/her inefficient operation. In these embodiments, a fuel efficiency tool provides this capability. The fuel efficiency tool comprises: an analysis component configured to analyze usage patterns of a vehicle; a calculation component configured to calculate a vehicle fuel efficiency for each of the usage patterns; and a notification component configured to: provide a real-time notification to a user of the vehicle indicating each of the following via a feedback device within the vehicle: a numerical representation of the vehicle fuel efficiency calculated for each of the plurality of recurring driver habits; and a monetary value indicating an amount of money sacrificed by at least one vehicle usage pattern that is contributing to inefficient vehicle fuel consumption.

19 Claims, 4 Drawing Sheets

(51) Int. Cl.
*G06G 7/76* (2006.01)
*G07C 5/08* (2006.01)
*B60W 40/09* (2012.01)
*B60W 50/14* (2012.01)
*G06Q 30/02* (2012.01)

(56) References Cited

U.S. PATENT DOCUMENTS

| | | | | |
|---|---|---|---|---|
| 2004/0267561 | A1* | 12/2004 | Meshkin et al. | 705/1 |
| 2005/0173523 | A1* | 8/2005 | Yushio et al. | 235/384 |
| 2007/0174004 | A1* | 7/2007 | Tenzer et al. | 701/123 |
| 2007/0203625 | A1* | 8/2007 | Quigley et al. | 701/33 |
| 2007/0255457 | A1* | 11/2007 | Whitcomb et al. | 700/273 |
| 2007/0256481 | A1* | 11/2007 | Nishiyama et al. | 73/113 |
| 2009/0105897 | A1* | 4/2009 | Breslau et al. | 701/29 |
| 2009/0157290 | A1 | 6/2009 | Ji et al. | |
| 2009/0222338 | A1* | 9/2009 | Hamilton et al. | 705/14 |
| 2009/0234528 | A1 | 9/2009 | Crombez | |
| 2009/0281715 | A1 | 11/2009 | Paik | |
| 2010/0076878 | A1* | 3/2010 | Burr et al. | 705/34 |
| 2010/0102997 | A1* | 4/2010 | Pikolon | 341/22 |
| 2010/0106352 | A1* | 4/2010 | Skaff et al. | 701/22 |

OTHER PUBLICATIONS

Rami Khatib, USPTO Final Office Action, U.S. Appl. No. 12/634,712, Mail Date Nov. 6, 2012, 19 pages.
Rami Khatib, USPTO Office Action, U.S. Appl. No. 12/634,712, Mail Date Jun. 10, 2013, 20 pages.
Rami Khatib, USPTO Final Office Action, U.S. Appl. No. 12/634,712, Mail Date Oct. 2, 2013, 20 pages.
Rami Khatib, USPTO Notice of Allowance and Fee(s) Due, U.S. Appl. No. 12/634,712, Mail Date Feb. 18, 2014, 20 pages.

* cited by examiner

VEHICLE FUEL EFFICIENCY OPTIMIZATION BASED ON VEHICLE USAGE PATTERNS

CROSS-REFERENCE TO RELATED APPLICATIONS

This application is a continuation of, and claims the benefit of, co-pending and co-owned U.S. patent application Ser. No. 12/634,712, filed Dec. 10, 2009, the entire contents of which are herein incorporated by reference.

FIELD OF THE INVENTION

The present invention relates generally to vehicle fuel analysis, and more specifically, to vehicle fuel efficiency of vehicle usage patterns.

BACKGROUND OF THE INVENTION

There are currently approximately 750 million passenger cars worldwide, and that number is only expected to increase. With rising fuel costs and environmental effects due to inefficient fuel consumption, an important design goal of vehicle information systems is to provide users with information about fuel economy during operation of the vehicle. Many vehicles display a measure of fuel economy, such as the gas mileage in miles per gallon. However, current systems only perform simple calculations on fuel usage and do not analyze vehicle usage patterns to detect inefficient fuel consumption patterns. Users are less likely to get information that can help them improve fuel economy from these fuel economy measures, and thus, are more likely to ignore them. Modern motor vehicles are typically equipped with a variety of onboard computers for measuring and recording vehicle performance and diagnostic data. These devices provide a large amount of information about the performance of the vehicle during operation. However, current systems fail to notify users of driving patterns that cause excess fuel consumption, and to provide incentives to users for improving vehicle fuel efficiency.

SUMMARY OF THE INVENTION

In one embodiment, there is a method for indicating a vehicle fuel efficiency for at least one vehicle usage pattern, the method comprising: analyzing, via a computing device, a set of vehicle usage patterns of a vehicle; calculating, via the computing device, a vehicle fuel efficiency for each of the usage patterns of the vehicle; and providing, via the computing device, a real-time notification to a user of the vehicle indicating each of the following via a feedback device within the vehicle: a numerical representation of the vehicle fuel efficiency calculated for each of the plurality of the set of vehicle usage patterns; and a monetary value indicating an amount of money sacrificed by at least one vehicle usage pattern from the set of the vehicle usage patterns that is contributing to inefficient vehicle fuel consumption.

In a second embodiment, there is a system for indicating a vehicle fuel efficiency for at least one vehicle usage pattern, the system comprising: at least one processing unit; memory operably associated with the at least one processing unit; and a fuel efficiency tool storable in memory and executable by the at least one processing unit, the fuel efficiency tool comprising: an analysis component configured to analyze a set of vehicle usage patterns of a vehicle; a calculation component configured to calculate a vehicle fuel efficiency for each of the usage patterns of the vehicle; and a notification component configured to: provide a real-time notification to a user of the vehicle indicating each of the following via a feedback device within the vehicle: a numerical representation of the vehicle fuel efficiency calculated for each of the plurality of recurring driver habits; and a monetary value indicating an amount of money sacrificed by at least one vehicle usage pattern from the set of the vehicle usage patterns that is contributing to inefficient vehicle fuel consumption.

In a third embodiment, there is a computer-readable tangible storage device storing computer instructions, which when executed, enables a computer system to indicate a vehicle fuel efficiency for at least one vehicle usage pattern, the computer instructions comprising: analyzing a set of vehicle usage patterns of a vehicle; calculating a vehicle fuel efficiency for each of the usage patterns of the vehicle; and providing a real-time notification to a user of the vehicle indicating each of the following via a feedback device within the vehicle: a numerical representation of the vehicle fuel efficiency calculated for each of the plurality of the set of vehicle usage patterns; and a monetary value indicating an amount of money sacrificed by at least one vehicle usage pattern from the set of the vehicle usage patterns that is contributing to inefficient vehicle fuel consumption.

Figure 1:
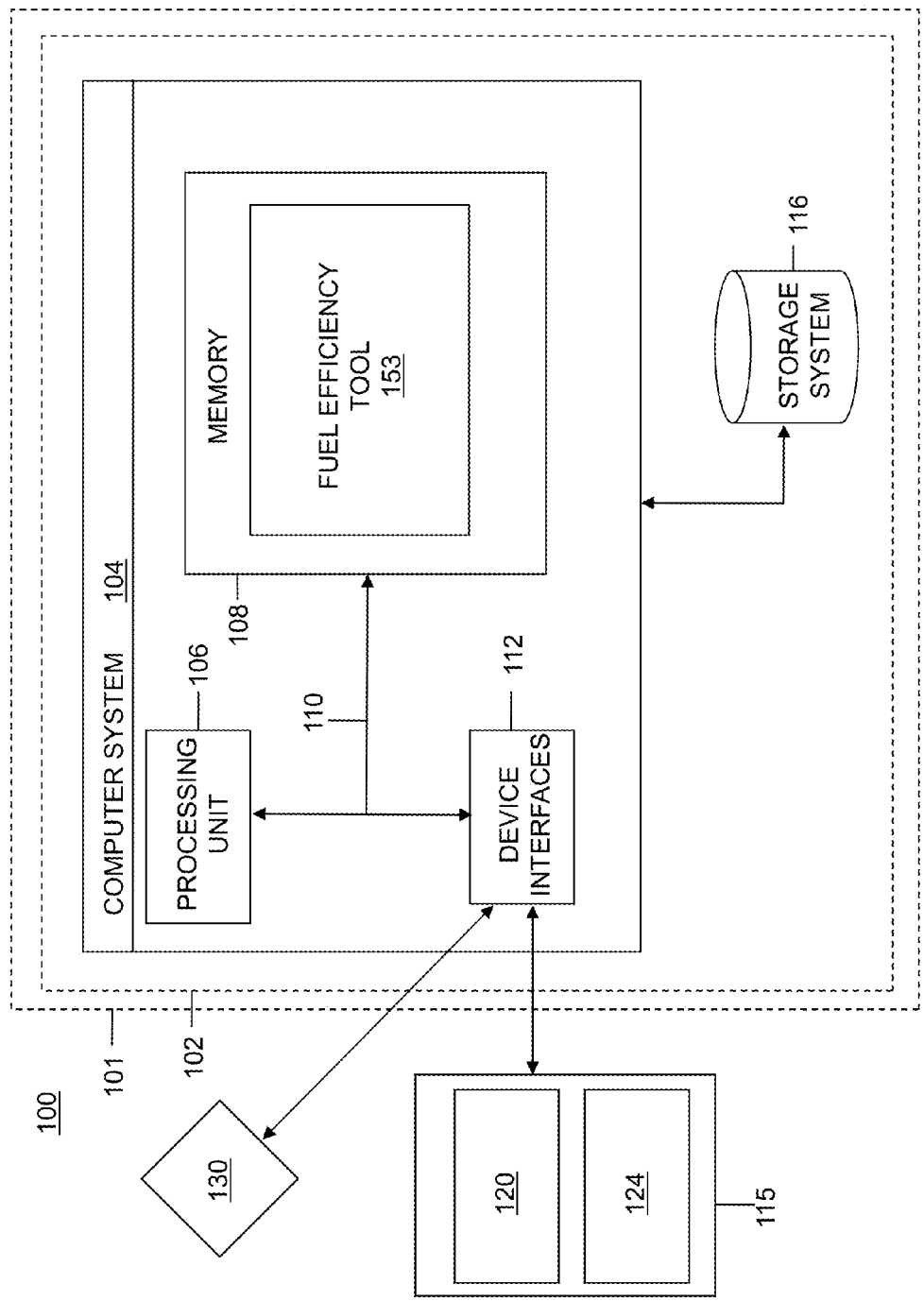
FIG. 1 shows a schematic of an exemplary computing environment in which elements of the present invention may operate.

The drawings are not necessarily to scale. The drawings are merely schematic representations, not intended to portray every parameter of the invention. The drawings are intended to depict only typical embodiments of the invention, and therefore should not be considered as limiting the scope of the invention. In the drawings, like numbering represents like elements.

DETAILED DESCRIPTION OF THE INVENTION

Embodiments of this invention are directed to methods and system for indicating a vehicle fuel efficiency for vehicle usage patterns. The invention analyzes vehicle usage patterns to discern if the vehicle is being operated in a fuel efficient manner. Patterns of inefficient operation are detected and conveyed to the user to inform the user of the impact of his/her inefficient operation. In these embodiments, a fuel efficiency tool provides this capability. Specifically, The fuel efficiency tool comprises: an analysis component configured to analyze a set (i.e., one or more) of vehicle usage patterns of a vehicle, and a calculation component configured to calculate a vehicle fuel efficiency for each of the set of vehicle usage patterns. The fuel efficiency tool further comprises a notification component configured to provide a notification to a user (e.g., a driver) of the vehicle indicating a vehicle fuel efficiency calculated for at least one of the set of vehicle usage patterns.

It will be appreciated that the term "vehicle" or other similar term as used herein is inclusive of motor vehicles in general, such as passenger automobiles including sports utility vehicles (SUV), buses, trucks, various commercial vehicles, motorcycles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum).

FIG. 1 illustrates a computerized implementation 100 of the present invention. As depicted, implementation 100 includes computer system 104 deployed within a computer infrastructure 102, which is present within a vehicle 101. This is intended to demonstrate, among other things, that the present invention could be implemented within a network environment (e.g., the Internet, a wide area network (WAN), a local area network (LAN), a virtual private network (VPN), etc.), or on a stand-alone computer system. In the case of the former, communication throughout the network can occur via any combination of various types of communications links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer infrastructure 102 is intended to demonstrate that some or all of the components of implementation 100 could be deployed, managed, serviced, etc., by a service provider who offers to implement, deploy, and/or perform the process of the present invention for others.

Computer system 104 is intended to represent any type of computer system that may be implemented in deploying/realizing the teachings recited herein, including a computer capable of operating within vehicle 101. In this particular example, computer system 104 represents an illustrative system for generating a coding scheme for indicating a vehicle fuel efficiency. It should be understood that any other computers implemented under the present invention may have different components/software, but will perform similar processes. As further shown, computer system 104 includes a processing unit 106 capable of analyzing and comparing data from external devices 115, as will be further described below. Also shown is memory 108 for storing a fuel efficiency tool 153, a bus 110, and device interfaces 112.

Processing unit 106 collects and routes signals representing data collected from external devices 115. The signals can be transmitted over a LAN and/or a WAN (e.g., T1, T3, 56 kb, X.25), broadband connections (ISDN, Frame Relay, ATM), wireless links (802.11, Bluetooth, etc.), and so on. In some embodiments, the data may be encrypted using, for example, trusted key-pair encryption. Different systems may transmit information using different communication pathways, such as Ethernet or wireless networks, direct serial or parallel connections, USB, Firewire®, Bluetooth®, or other proprietary interfaces. (Firewire is a registered trademark of Apple Computer, Inc. Bluetooth is a registered trademark of Bluetooth Special Interest Group (SIG)). Computer system 104 is shown communicating with sensor devices 120 that communicate with bus 110 via device interfaces 112. Sensor devices 120 includes any sensor devices for capturing data regarding the operation of vehicle 101. Sensor devices 120 can include virtually any type of sensor capable of capturing sensor data of sufficient quality to support the methods of the invention as described herein, including capturing vehicle usage patterns.

In general, processing unit 106 executes computer program code, such as program code for operating fuel efficiency tool 153, which is stored in memory 108 and/or storage system 116. While executing computer program code, processing unit 106 can read and/or write data to/from memory 108 and storage system 116. It will be appreciated that storage system 116 can include VCRs, DVRs, RAID arrays, USB hard drives, optical disk recorders, flash storage devices, general purpose computers, and/or other data processing and storage elements for storing and/or processing data.

Figure 2:
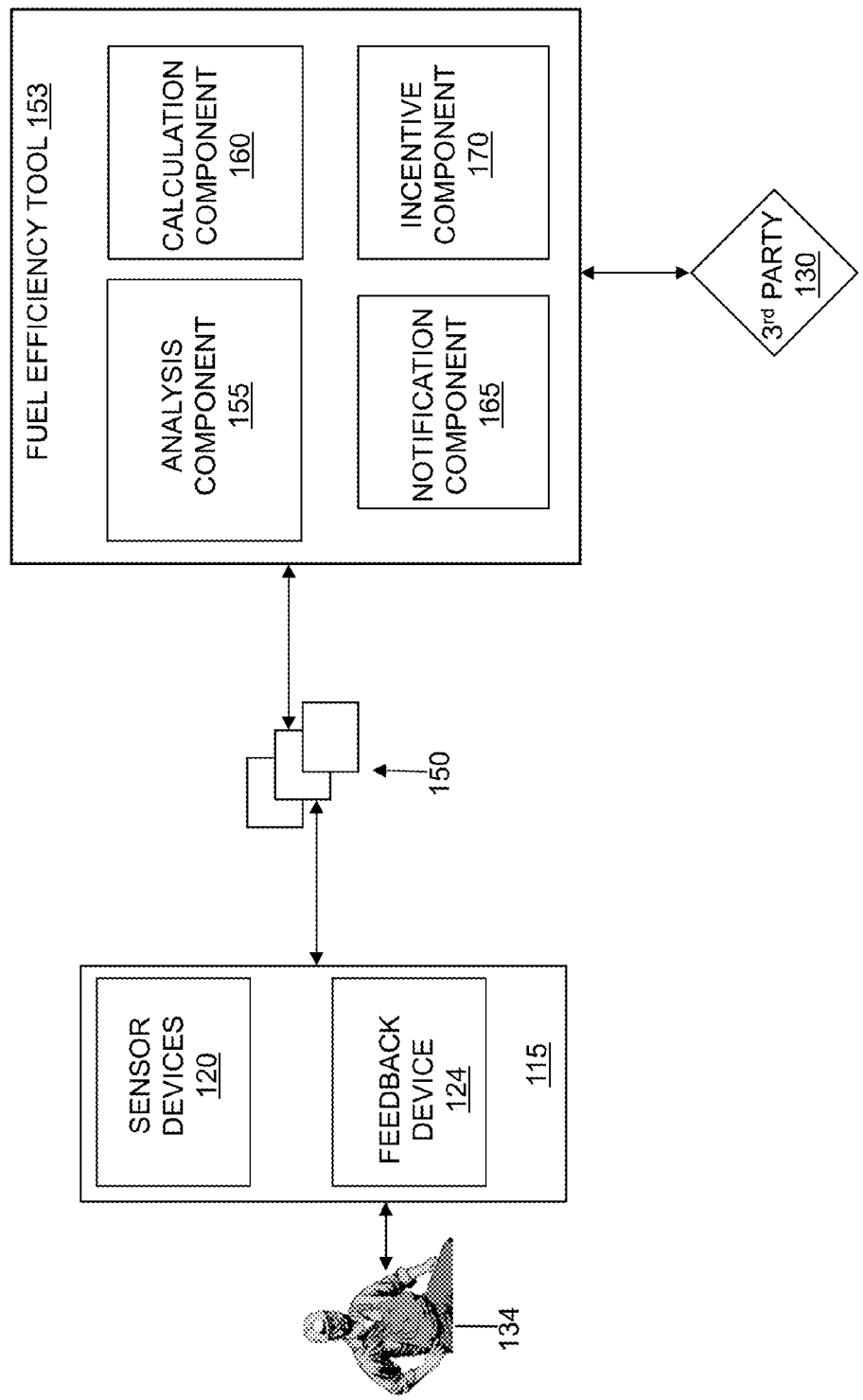
FIG. 2 shows a fuel efficiency tool that operates in the environment shown in FIG. 1.

FIG. 2 shows a more detailed view of fuel efficiency tool 153 according to embodiments of the invention. Fuel efficiency tool 153 operates with sensor devices 120 and a feedback device 124 to detect patterns of inefficient vehicle operation, and to convey the results to a user 134 of vehicle 101. As shown in FIG. 2, fuel efficiency tool 153 comprises an analysis component 155 configured to analyze a set of vehicle usage patterns 150 of vehicle 101. Data is received from sensor devices 120 and sent to analysis component 155 to track vehicle operation over periods of time to develop or discern the user's driving patterns. For example, analysis component 155 collects vehicle driving information, including rapid acceleration and/or deceleration, extended periods of engine idling, driving in an improper gear for a given speed, navigating steep grades, excessive use of low gears, towing often and/or hauling excessive weight, poor traction and/or wheel slip, exceeding fuel efficient highway speeds, a high number of short-distance trips, frequent cold-engine driving, etc. It will be appreciated that any number or combination of sensor devices and collection techniques may be used for gathering vehicle driving information.

Next, the vehicle usage patterns 150 are tracked over predetermined periods of time to ascertain the user's efficiency (i.e., the relationship between vehicle use and the amount of fuel consumed). Specifically, fuel efficiency tool 153 comprises a calculation component 160 configured to calculate a vehicle fuel efficiency for each of the set of vehicle usage patterns 150. Fuel efficiency of vehicle 101 may be monitored in real-time using telemetry transmitted from the vehicle. In one embodiment, the telemetry may be analyzed in combination with a fuel efficiency model in order to determine whether the real-time fuel efficiency determination deviates from a baseline fuel efficiency. However, it will be appreciated that occasional inefficient operations would not constitute overall inefficient driving as there may be reasons for inefficient vehicle usage patterns (e.g., special cases requiring a high revolutions per minute, including passing, climbing steep grades, down shifting, etc.).

Next, user 134 is notified through visual and/or auditory methods that vehicle 101 is being operated in an inefficient manner. To accomplish this, fuel efficiency tool 153 comprises a notification component 165 configured to provide a notification to user 134 of vehicle 101 indicating the vehicle fuel efficiency calculated by calculation component 160 for at least one of vehicle usage patterns 150. Specifically, notification component 165 provides feedback (via feedback device 124) to user 134 of vehicle 101 identifying at least one vehicle usage pattern from set of vehicle usage patterns 150 that is contributing to inefficient vehicle fuel consumption. During operation, feedback device 124 indicates a measure of excess fuel consumed due to inefficient driving patterns. Feedback device 124 provides user 134 with real-time messages indicating the inefficient vehicle usage pattern so that user 134 may take corrective action to increase fuel efficiency. The feedback is dynamically presented to user 134, and may comprise a variety of audio and/or visual indicators presented on any number of feedback devices. For example, feedback device 124 may comprise a visual indicator such as an LED, a multicolor LED, an LCD display, or a dial with a needle. Feedback device 124 may also comprise a factory-installed automobile feedback device (e.g., AM/FM/CD/MP3 display and stereo speakers, navigation system display, etc.), or may be an after-market audio/visual feedback device that can be installed and configured for use with fuel efficiency tool 153. Furthermore, feedback device 124 may comprise an audio indicator such as a beeping sound, a set of words indicating the inefficient driving pattern, instructions for avoiding or improving the inefficient driving pattern, etc.

In another embodiment, the driver may be notified as to an impact caused by the driver's inefficient vehicle operation. In this way, user 134 may better appreciate the positive or negative impact(s) of various vehicle usage patterns when presented with more tangible feedback. For example, instead of simply displaying a miles per gallon (mpg) for a particular vehicle usage pattern, user 134 may be presented with a mpg value, along with an indication of emission pollutants (e.g., oxides of nitrogen, oxides of sulfur (NOx and SOx) and greenhouse gases) released during patterns of inefficient driving. Additionally, user 134 may be presented with a monetary value, which represents an approximate amount of money lost due to the inefficient driving pattern. User 134 may also be presented with the monetary amount to be gained if user 134 increases driving efficiency by modifying one or more vehicle usage patterns. To accomplish this, calculation component 160 is configured to calculate an environmental impact and/or a monetary impact caused by the at least one vehicle usage pattern from set of the vehicle usage patterns 150 that is contributing to inefficient vehicle fuel consumption. Following this, notification component 165 is configured to notify user 134 of the environmental and/or monetary impact caused by the at least one vehicle usage pattern from the set of the vehicle usage patterns 150 that is contributing to inefficient vehicle fuel consumption. As such, notification component 165 presents the user with a real-world impact(s) caused by excess fuel consumption in terms that user 134 is more likely to appreciate.

In yet another embodiment, data representing vehicle fuel efficiency may also be sent to a third party 130 (e.g., the Environmental Protection Agency (EPA), Department of Motor Vehicles, vehicle manufacturers, highway billing systems, etc.) for analysis. In this embodiment, notification component 165 is configured to provide a notification to third party 130 indicating the vehicle fuel efficiency calculated for at least one of the set of vehicle usage patterns 150 for user 134. In another example, the notification may indicate the vehicle fuel efficiency calculated for each of set of vehicle usage patterns 150, the environmental impact caused by at least one vehicle usage pattern from set of vehicle usage patterns 150 that is contributing to inefficient vehicle fuel consumption, or the monetary impact caused by at least one vehicle usage pattern from set of the vehicle usage patterns 150 that is contributing to inefficient vehicle fuel consumption. Communication between fuel efficiency tool 153 and third party 130 can occur via any combination of various types of communications links. In this embodiment, a wireless system may be used for transmitting the fuel efficiency data of vehicle 101 to third party 130. Where communications occur via the Internet, connectivity could be provided by conventional TCP/IP sockets-based protocol, and an Internet service provider could be used to establish connectivity to the Internet. Data may be sent from fuel efficiency tool 153 while vehicle 101 is in use, or may be transmitted and/or viewed at a service or diagnostic station.

In another embodiment, third party 130 operates with an incentive component 170 to provide an assessment to user 134 based on the vehicle fuel efficiency data that is collected. Specifically, fuel efficiency tool 153 comprises incentive component 170, which is configured to generate a monetary incentive (i.e., an assessment, fee, etc.) to user 134 of vehicle 101 to modify the at least one vehicle usage pattern from set of the vehicle usage patterns 150 that is contributing to inefficient vehicle fuel consumption. Incentive component 170 operates with third party 130, which may monitor notifications from notification component 165 to charge fees to users responsible for higher fuel consumption. In one example, state taxing authority regulations/tables may be used for calculating an appropriate fee, which may increase as fuel consumption increases. Incentive component 170 may automatically debit a bank account of user 134 to cover any fees generated on the basis of inefficient driving patterns. However, it will be appreciated that incentive component 170 can also provide positive benefits to drivers who display efficient driving patterns. For example, credits or rewards may be provided to a user who maintains efficient vehicle usage patterns, or who modifies his/her driving habits to effect an improvement in vehicle fuel efficiency.

It can be appreciated that the methodologies disclosed herein can be used within a computer system to indicating a vehicle fuel efficiency for at least one vehicle usage pattern, as shown in FIG. 1. In this case, fuel efficiency tool 153 can be provided, and one or more systems for performing the processes described in the invention can be obtained and deployed to computer infrastructure 102. To this extent, the deployment can comprise one or more of (1) installing program code on a computing device, such as a computer system, from a computer-readable medium; (2) adding one or more computing devices to the infrastructure; and (3) incorporating and/or modifying one or more existing systems of the infrastructure to enable the infrastructure to perform the process actions of the invention.

The exemplary computer system 104 may be described in the general context of computer-executable instructions, such as program modules, being executed by a computer. Generally, program modules include routines, programs, people, components, logic, data structures, and so on that perform particular tasks or implements particular abstract data types. Exemplary computer system 104 may be practiced in distributed computing environments where tasks are performed by remote processing devices that are linked through a communications network. In a distributed computing environment, program modules may be located in both local and remote computer storage media including memory storage devices.

Figure 3:
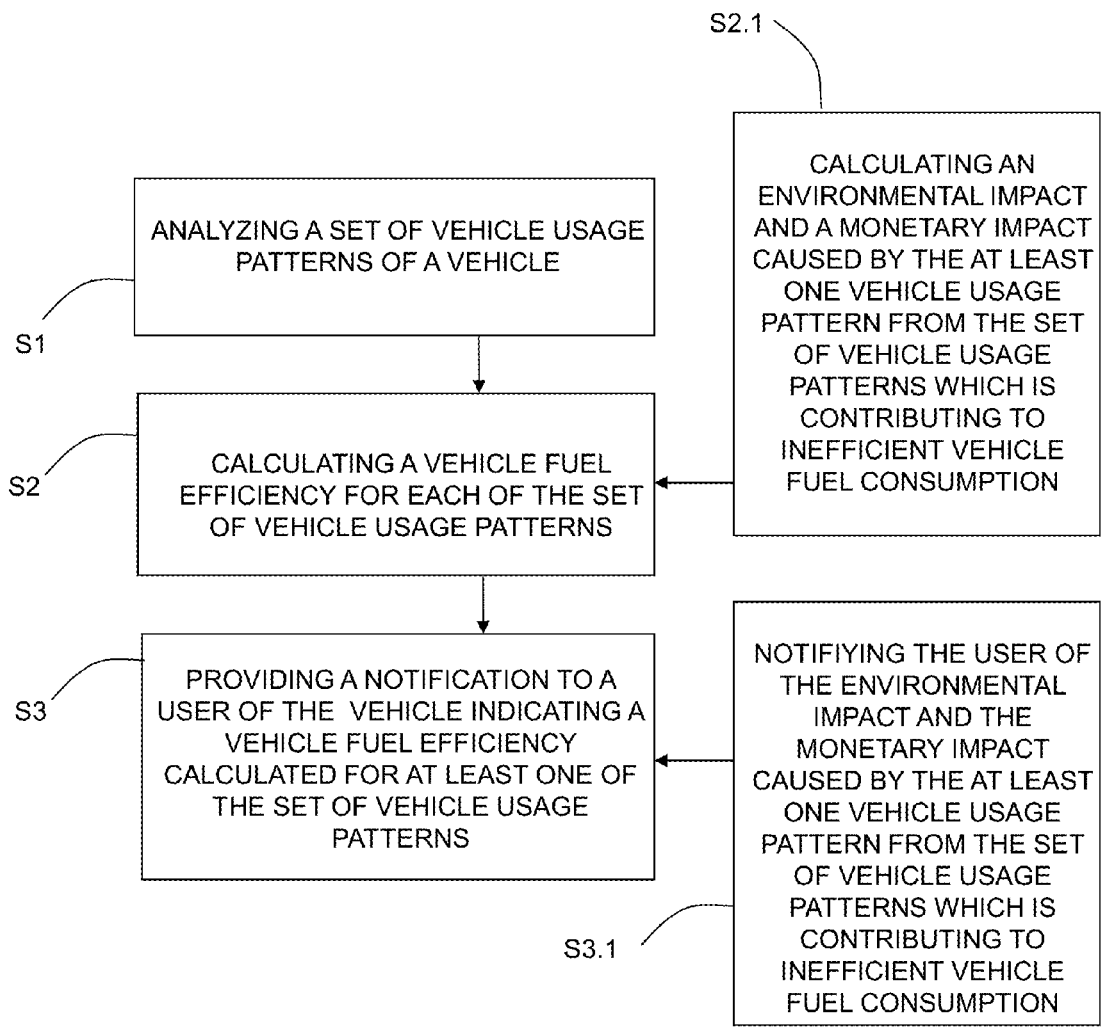
FIG. 3 shows a flow diagram of a method for indicating a vehicle fuel efficiency for at least one vehicle usage pattern according to embodiments of the invention.

The program modules carry out the methodologies disclosed herein, as shown in FIG. 3. According to one embodiment, at S1, a set of vehicle usage patterns is analyzed. At S2, a vehicle fuel efficiency is calculated for each of the set of vehicle usage patterns. In an alternative embodiment, at S2.1, the environmental impact and a monetary impact caused by the at least one vehicle usage pattern from the set of vehicle usage patterns that is contributing to inefficient vehicle operation is calculated. At S3, a notification is provided to the user of the vehicle indicating a vehicle fuel efficiency calculated for at least one of the set of vehicle usage patterns. In an alternative embodiment, at S3.1, the user of the vehicle is also notified of the environmental impact and the monetary impact caused by the at least one vehicle usage pattern from the set of vehicle usage patterns that is contributing to inefficient vehicle fuel consumption.

Figure 4:
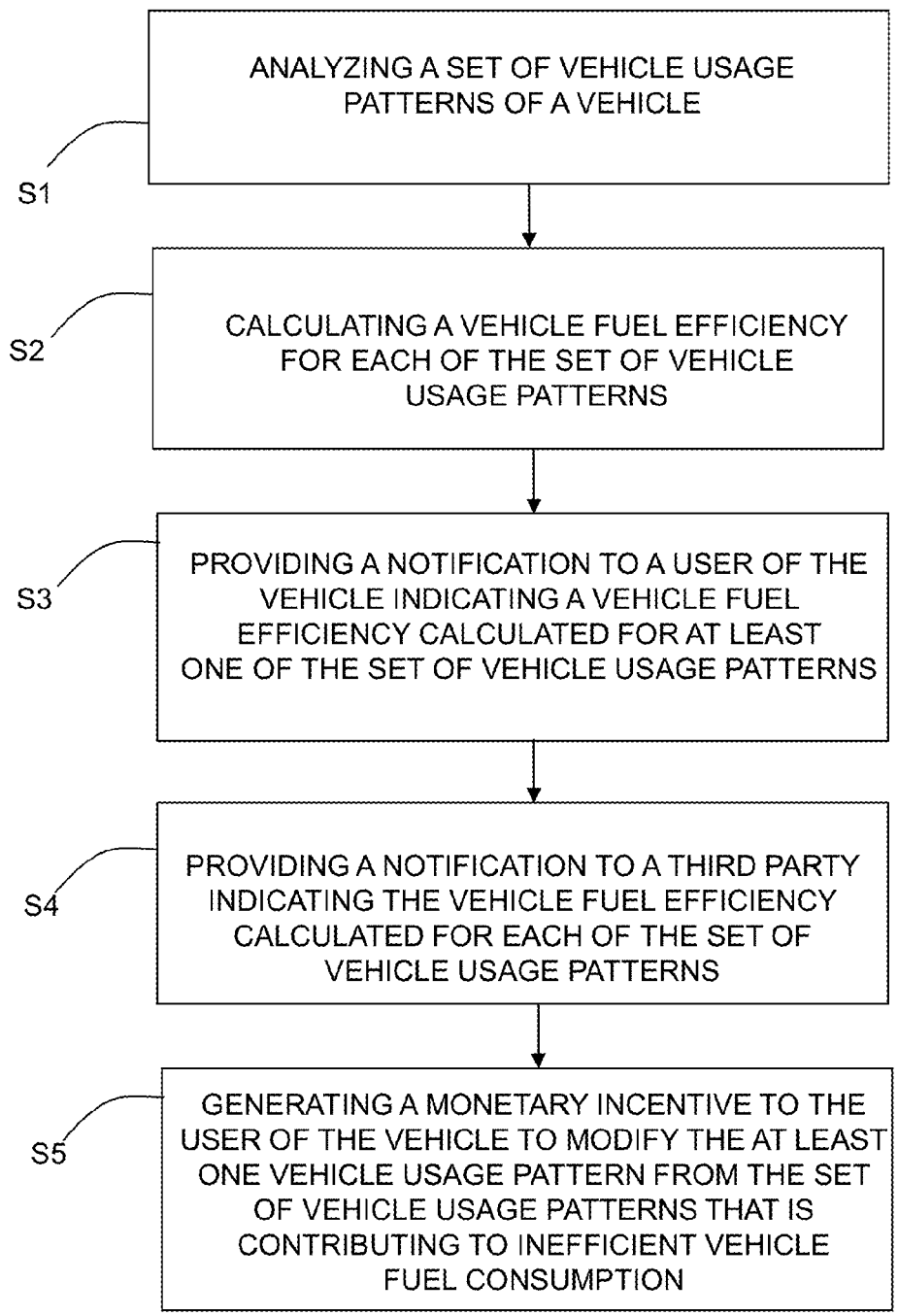
FIG. 4 shows a flow diagram of a method for indicating a vehicle fuel efficiency for at least one vehicle usage pattern according to embodiments of the invention.

FIG. 4 illustrates an alternative methodology for encouraging efficient vehicle usage patterns, as described herein. According to one embodiment, at S1, a set of vehicle usage patterns is analyzed. At S2, a vehicle fuel efficiency is calculated for each of the set of vehicle usage patterns. At S3, a notification is provided to the user of the vehicle indicating a vehicle fuel efficiency calculated for at least one of the set of vehicle usage patterns. At S4, a notification is provided to a third party indicating the vehicle fuel efficiency calculated for each of the set of vehicle usage patterns. At S5, a monetary incentive to modify the at least one vehicle usage pattern from the set of the vehicle usage patterns that is contributing to inefficient vehicle fuel consumption the user of the vehicle is generated.

The flowcharts of FIGS. 3-4 illustrate the architecture and operation of possible implementations of systems, methods and computer program products according to various embodiments of the present invention. In this regard, each block in the flowchart may represent a module, segment, or portion of code, which comprises one or more executable instructions for implementing the specified logical process(s). It should also be noted that, in some alternative implementations, the process noted in the blocks may occur out of the order noted in the figures. For example, two blocks shown in succession may, in fact, be executed substantially concurrently. It will also be noted that each block of flowchart illustration can be implemented by special purpose hardware-based systems that perform the specified process or acts, or combinations of special purpose hardware and computer instructions.

Furthermore, an implementation of exemplary computer system 104 (FIG. 1) may be stored on or transmitted across some form of computer readable media. Computer readable media can be any available media that can be accessed by a computer. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media.

The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

It is apparent that there has been provided with this invention an approach for indicating a vehicle fuel efficiency for at least one vehicle usage pattern. While the invention has been particularly shown and described in conjunction with a preferred embodiment thereof, it will be appreciated that variations and modifications will occur to those skilled in the art. Therefore, it is to be understood that the appended claims are intended to cover all such modifications and changes that fall within the true spirit of the invention.

What is claimed is:

1. A method for indicating a vehicle fuel efficiency for at least one vehicle usage pattern, the method comprising:
   analyzing, via a computing device, a set of vehicle usage patterns of a vehicle;
   calculating, via the computing device, a vehicle fuel efficiency for each of the set of vehicle usage patterns of the vehicle; and
   providing, via the computing device, a real-time notification to a user of the vehicle indicating each of the following via a feedback device within the vehicle:
      a numerical representation of the vehicle fuel efficiency calculated for each of the set of vehicle usage patterns; and
      a monetary value indicating an amount of money sacrificed by at least one vehicle usage pattern from the set of the vehicle usage patterns that is contributing to inefficient vehicle fuel consumption.

2. The method of claim 1, the providing comprising identifying at least one vehicle usage pattern from the set of the vehicle usage patterns that is contributing to inefficient vehicle fuel consumption.

3. The method of claim 2, further comprising:
   calculating, via the computing device, an environmental impact caused by the at least one vehicle usage pattern from the set of the vehicle usage patterns that is contributing to inefficient vehicle fuel consumption; and
   notifying, via the computing device, the user of the environmental impact caused by the at least one vehicle usage pattern from the set of the vehicle usage patterns that is contributing to inefficient vehicle fuel consumption.

4. The method of claim 2, further comprising generating, via the computing device, an incentive to the user of the vehicle to modify the at least one vehicle usage pattern from the set of the vehicle usage patterns that is contributing to inefficient vehicle fuel consumption.

5. The method of claim 1, further comprising providing, via the computing device, a notification to a third party indicating the vehicle fuel efficiency calculated for at least one of the set of vehicle usage patterns.

6. The method of claim 5, further comprising charging, via the computing device, a fee by the third party for indicating the vehicle fuel efficiency calculated for at least one of the set of vehicle usage patterns.

7. A system for indicating a vehicle fuel efficiency for at least one vehicle usage pattern, the system comprising:
   at least one processing unit;
   memory operably associated with the at least one processing unit; and
   a fuel efficiency tool storable in memory and executable by the at least one processing unit, the fuel efficiency tool comprising:
      an analysis component configured to analyze a set of vehicle usage patterns of a vehicle;
      a calculation component configured to calculate a vehicle fuel efficiency for each of the set of vehicle usage patterns of the vehicle; and
      a notification component configured to: provide a real-time notification to a user of the vehicle indicating each of the following via a feedback device within the vehicle:
         a numerical representation of the vehicle fuel efficiency calculated for each of the set of vehicle usage patterns; and
         a monetary value indicating an amount of money sacrificed by at least one vehicle usage pattern from the set of the vehicle usage patterns that is contributing to inefficient vehicle fuel consumption.

8. The fuel efficiency tool according to claim 7, the notification component further configured to provide feedback to the user of the vehicle identifying at least one vehicle usage pattern from the set of the vehicle usage patterns that is contributing to inefficient vehicle fuel consumption.

9. The fuel efficiency tool according to claim 8, the calculation component further configured to:
   calculate an environmental impact caused by the at least one vehicle usage pattern from the set of the vehicle usage patterns that is contributing to inefficient vehicle fuel consumption; and
   calculate a monetary impact caused by the at least one vehicle usage pattern from the set of the vehicle usage patterns that is contributing to inefficient vehicle fuel consumption.

10. The fuel efficiency tool according to claim 9, the notification component further configured to notify the user of the environmental impact caused by the at least one vehicle usage pattern from the set of the vehicle usage patterns that is contributing to inefficient vehicle fuel consumption.

11. The fuel efficiency tool according to claim 10, further comprising an incentive component configured to generate an incentive to the user of the vehicle to modify the at least one vehicle usage pattern from the set of the vehicle usage patterns that is contributing to inefficient vehicle fuel consumption.

12. The fuel efficiency tool according to claim 9, the notification component further configured to provide a notification to a third party indicating the vehicle fuel efficiency calculated for at least one of the set of vehicle usage patterns.

13. The fuel efficiency tool according to claim 12, the third party configured to charge a fee for indicating the vehicle fuel efficiency calculated for at least one of the set of vehicle usage patterns.

14. A computer-readable tangible storage device storing computer instructions, which when executed, enables a computer system to indicate a vehicle fuel efficiency for at least one vehicle usage pattern, the computer instructions comprising:
   analyzing a set of vehicle usage patterns of a vehicle;
   calculating a vehicle fuel efficiency for each of the set of vehicle usage patterns of the vehicle; and
   providing a real-time notification to a user of the vehicle indicating each of the following via a feedback device within the vehicle:
      a numerical representation of the vehicle fuel efficiency calculated for each of the set of vehicle usage patterns; and
      a monetary value indicating an amount of money sacrificed by at least one vehicle usage pattern from the set of the vehicle usage patterns that is contributing to inefficient vehicle fuel consumption.

15. The computer-readable tangible storage device according to claim 14, the computer instructions for providing further comprising providing feedback to the user of the vehicle identifying at least one vehicle usage pattern from the set of the vehicle usage patterns that is contributing to inefficient vehicle fuel consumption.

16. The computer-readable tangible storage device according to claim 15, further comprising computer instructions for calculating an environmental impact caused by the at least one vehicle usage pattern from the set of the vehicle usage patterns that is contributing to inefficient vehicle fuel consumption.

17. The computer-readable tangible storage device according to claim 16, further comprising computer instructions for notifying the user of the environmental impact caused by the at least one vehicle usage pattern from the set of the vehicle usage patterns that is contributing to inefficient vehicle fuel consumption.

18. The computer-readable tangible storage device according to claim 15, further comprising computer instructions for generating an incentive to the user of the vehicle to modify the at least one vehicle usage pattern from the set of the vehicle usage patterns that is contributing to inefficient vehicle fuel consumption.

19. The computer-readable tangible storage device according to claim 14, further comprising computer instructions for providing a notification to a third party indicating the vehicle fuel efficiency calculated for at least one of the set of vehicle usage patterns.

* * * * *